US012724786B2

(12) United States Patent
Das et al.

(10) Patent No.: US 12,724,786 B2
(45) Date of Patent: Sep. 1, 2026

(54) DEFINING AND EXECUTING CUSTOM GENERATIVE ARTIFICIAL INTELLIGENCE AGENT ACTIONS ON SELECTED DATA ITEMS

(71) Applicant: Oracle International Corporation, Redwood Shores, CA (US)

(72) Inventors: Sreeji Krishnan Das, Fremont, CA (US); Chandra Sekhar Komali, Mountain House, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/194,500

(22) Filed: Apr. 30, 2025

(65) Prior Publication Data

US 2026/0072928 A1 Mar. 12, 2026

Related U.S. Application Data

(60) Provisional application No. 63/692,522, filed on Sep. 9, 2024.

(51) Int. Cl.

| | |
|---|---|
| ***G06F 16/24*** | (2019.01) |
| ***G06F 16/242*** | (2019.01) |
| ***G06F 16/248*** | (2019.01) |

(52) U.S. Cl.
CPC .......... *G06F 16/248* (2019.01); *G06F 16/243* (2019.01)

(58) Field of Classification Search
CPC ............................ G06F 16/243; G06F 16/248
See application file for complete search history.

(56) References Cited

U.S. PATENT DOCUMENTS

| | | | | |
|---|---|---|---|---|
| 2020/0341888 | A1 | 10/2020 | Sridhar et al. | |
| 2021/0342785 | A1* | 11/2021 | Mann ..................... | G06F 40/18 |

(Continued)

FOREIGN PATENT DOCUMENTS

| | | | |
|---|---|---|---|
| CN | 117170922 | A | 12/2023 |
| CN | 118626330 | A | 9/2024 |

OTHER PUBLICATIONS

"AI Agent", Retrieved from https://docs.logz.io/docs/user-guide/observability/assistantiq/, Retrieved on May 5, 2025, pp. 1-7.

(Continued)

*Primary Examiner* — Loc Tran
(74) *Attorney, Agent, or Firm* — Invoke

(57) ABSTRACT

Techniques for creating and executing custom AI-driven actions in a data analysis interface are disclosed. One or more embodiments receive user input that defines a custom action by specifying an AI prompt with a natural language query and context variables. This definition is stored for later use. One or more embodiments present a graphical user interface (GUI) displaying data items, allowing users to select a subset. Based on the stored definition of a custom action, an option to execute the custom action appears. When the option is chosen, one or more embodiments assign metadata values from the selected items to the context variables, creating initialized context variables. The complete prompt, including the query and initialized variables, is submitted to an AI agent. The AI's response is displayed in the GUI, providing context-aware insights within the data analysis workflow.

21 Claims, 7 Drawing Sheets

(56) References Cited

U.S. PATENT DOCUMENTS

| | | | | |
|---|---|---|---|---|
| 2024/0135110 | A1* | 4/2024 | Mujica-Parodi, III | G06F 16/243 |
| 2025/0355424 | A1* | 11/2025 | Murphy | G06Q 50/04 |
| 2025/0355847 | A1* | 11/2025 | Kozaris | G06F 16/22 |
| 2025/0358255 | A1* | 11/2025 | Kinsella | G06N 5/043 |
| 2026/0044500 | A1* | 2/2026 | Gorti | G06F 16/24522 |

OTHER PUBLICATIONS

"AI Insights", Retrieved from https://docs.logz.io/docs/user-guide/log-management/insights/ai-insights/, Retrieved on May 5, 2025, pp. 1-3.
"AI powered Data Analytics with Zia", Retrieved from https://www.zoho.com/analytics/zia/, Retrieved on May 5, 2025, pp. 1-19.
"Dashboards Page", Retrieved from https://www.logicmonitor.com/support/edwin/dashboards-page, Oct. 16, 2024, 2 Pages.
"GenAI Example Using Log Explain", Retrieved from https://docs.apica.io/logiq-events/log-explained-using-generative-ai/genai-example-using-log-explain, Retrieved on May 5, 2025, pp. 1-3.
"Get Started with Coralogix", Retrieved from https://coralogix.com/docs/user-guides/getting-started/get-started-with-coralogix/#support, Retrieved on May 5, 2025, pp. 1-6.
"Getting Started with Logz.io", Retrieved from https://docs.logz.io/docs/user-guide/quick-start/, Retrieved on May 5, 2025, pp. 1-9.
"Intro to Explore", Retrieved from https://docs.logz.io/docs/user-guide/new-explore/, Retrieved on May 5, 2025, pp. 1-9.
"LM Logs Overview", Retrieved from https://www.logicmonitor.com/support/Im-logs/Im-logs-overview, Nov. 5, 2024, 3 Pages.
"Log management and analytics", Retrieved from https://www.dynatrace.com/platform/log-management-analytics/, Retrieved on May 5, 2025, pp. 1-19.
"Logs in Explore Screen", Retrieved from https://coralogix.com/docs/user-guides/monitoring-and-insights/logs-screen/logs-in-explore-screen/, Retrieved on May 5, 2025, pp. 1-11.
"Splunk Log Observer Connect", Retrieved from https://www.splunk.com/en_us/products/log-observer-connect.html, Retrieved on May 5, 2025, pp. 1-8.
Dignan L., "Splunk adds genAI tools, more Cisco touchpoints across observability and security", Retrieved from https://www.constellationr.com/blog-news/insights/splunk-adds-genai-tools-more-cisco-touchpoints-across-observability-and-security, Jun. 12, 2024, 6 Pages.
Gill, "Log Analytics with Agentic AI and LLM", Retrieved from https://www.xenonstack.com/blog/log-analytics-agentic-ai, Oct. 8, 2024, 5 Pages.
Kris Manning, "Edwin AI, the GenAI teammate for IT observability", Retrieved from https://www.logicmonitor.com/edwin-ai, 1 Pages, Date not available.

* cited by examiner

Figure 2:
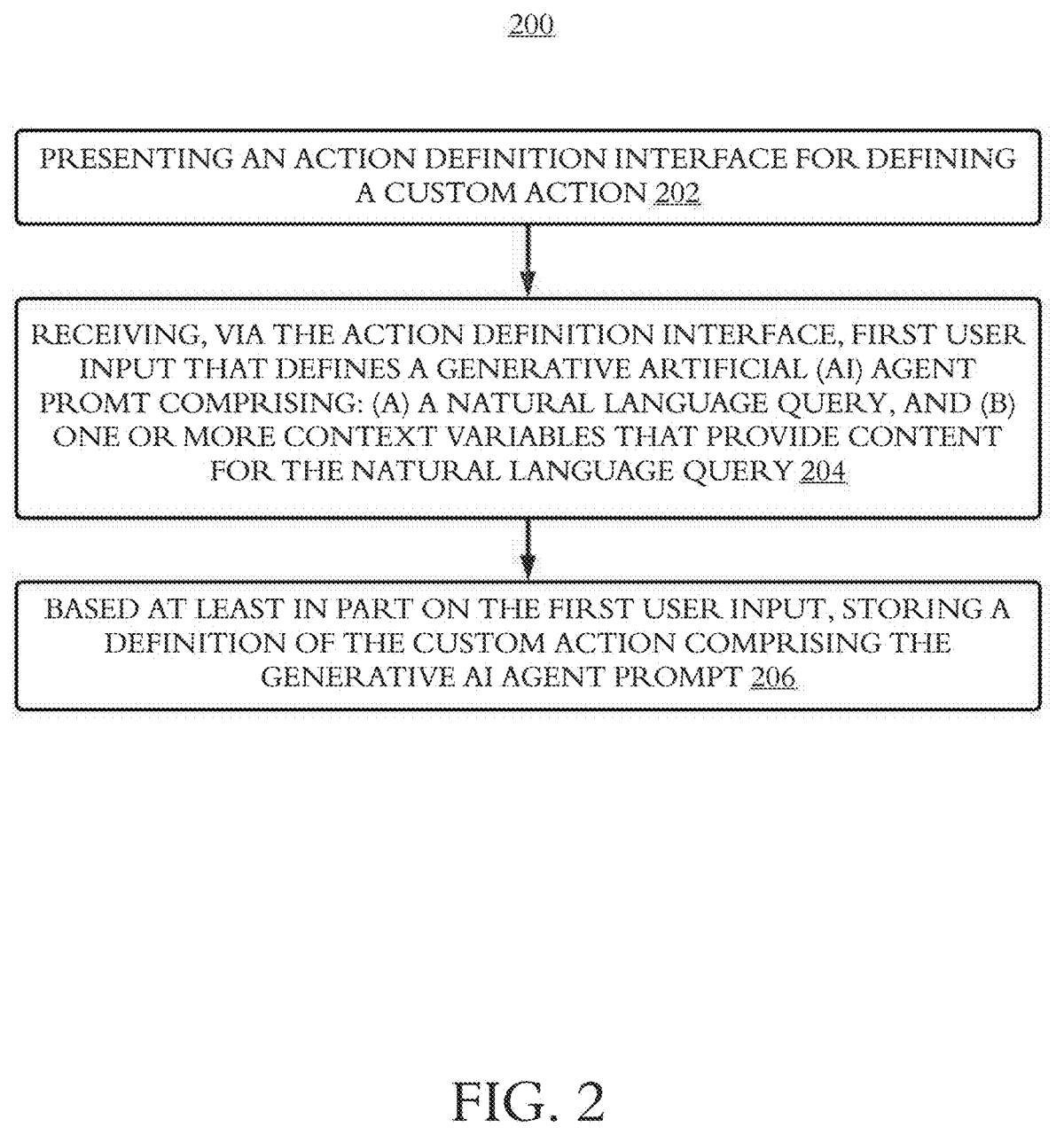

200

PRESENTING AN ACTION DEFINITION INTERFACE FOR DEFINING A CUSTOM ACTION 202

RECEIVING, VIA THE ACTION DEFINITION INTERFACE, FIRST USER INPUT THAT DEFINES A GENERATIVE ARTIFICIAL (AI) AGENT PROMT COMPRISING: (A) A NATURAL LANGUAGE QUERY, AND (B) ONE OR MORE CONTEXT VARIABLES THAT PROVIDE CONTENT FOR THE NATURAL LANGUAGE QUERY 204

BASED AT LEAST IN PART ON THE FIRST USER INPUT, STORING A DEFINITION OF THE CUSTOM ACTION COMPRISING THE GENERATIVE AI AGENT PROMPT 206

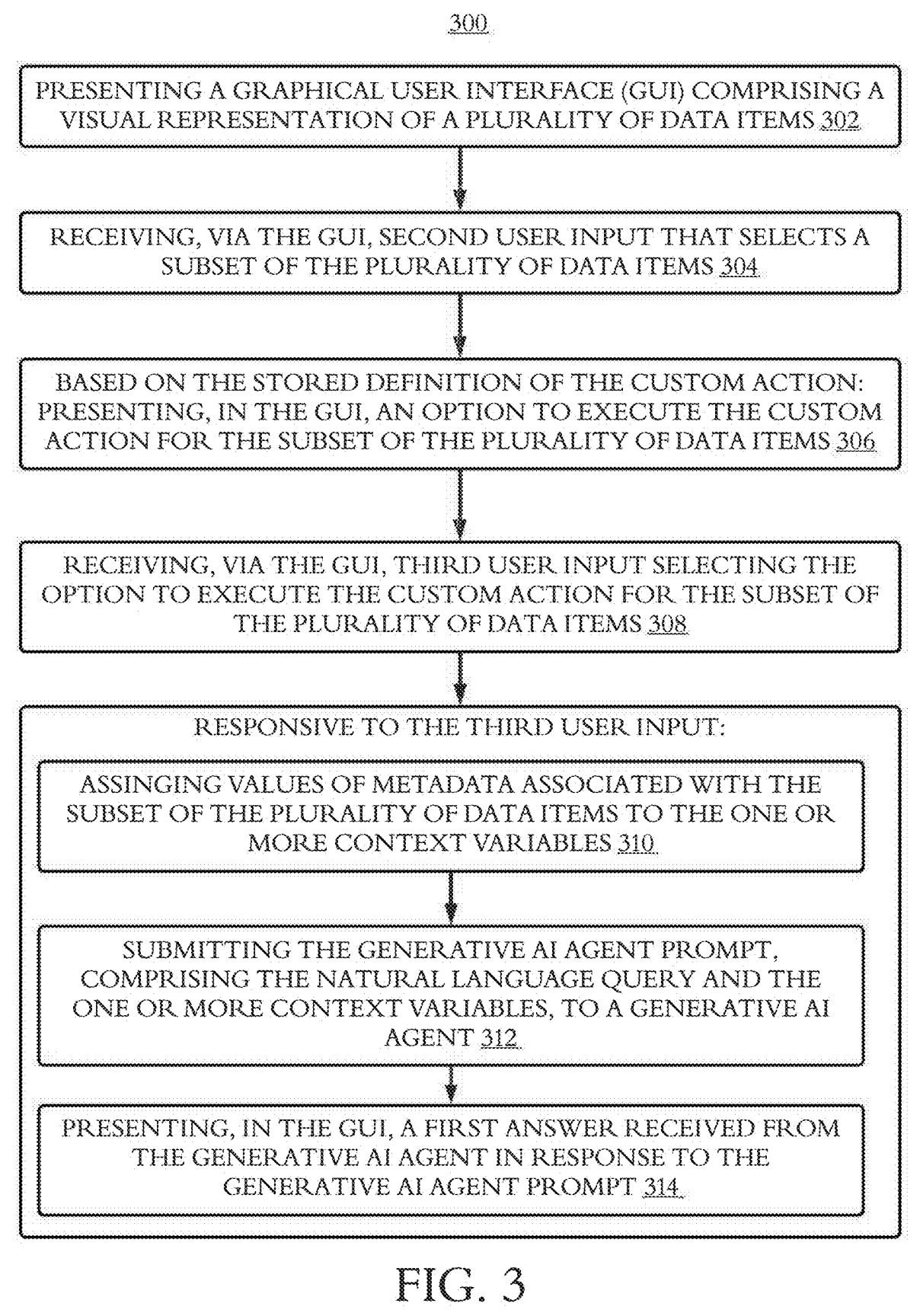

PRESENTING A GRAPHICAL USER INTERFACE (GUI) COMPRISING A VISUAL REPRESENTATION OF A PLURALITY OF DATA ITEMS 302

RECEIVING, VIA THE GUI, SECOND USER INPUT THAT SELECTS A SUBSET OF THE PLURALITY OF DATA ITEMS 304

BASED ON THE STORED DEFINITION OF THE CUSTOM ACTION: PRESENTING, IN THE GUI, AN OPTION TO EXECUTE THE CUSTOM ACTION FOR THE SUBSET OF THE PLURALITY OF DATA ITEMS 306

RECEIVING, VIA THE GUI, THIRD USER INPUT SELECTING THE OPTION TO EXECUTE THE CUSTOM ACTION FOR THE SUBSET OF THE PLURALITY OF DATA ITEMS 308

RESPONSIVE TO THE THIRD USER INPUT:

ASSINGING VALUES OF METADATA ASSOCIATED WITH THE SUBSET OF THE PLURALITY OF DATA ITEMS TO THE ONE OR MORE CONTEXT VARIABLES 310

SUBMITTING THE GENERATIVE AI AGENT PROMPT, COMPRISING THE NATURAL LANGUAGE QUERY AND THE ONE OR MORE CONTEXT VARIABLES, TO A GENERATIVE AI AGENT 312

PRESENTING, IN THE GUI, A FIRST ANSWER RECEIVED FROM THE GENERATIVE AI AGENT IN RESPONSE TO THE GENERATIVE AI AGENT PROMPT 314

FIG. 3

Action Definition Interface
400

```
Can you summarize the following information about a kubernetes system?
Node: $Node
Container: $Container
Number of Pods in this container: $ContainerPods
Namespace: $Namespace
Cluster Name: $KubernetesClusterName

Information about the specific pod $Pod:
Status: $Status
```

FIG. 4

DISPLAY 712
INPUT DEVICE 714
CURSOR CONTROL 716
MAIN MEMORY 706
ROM 708
STORAGE DEVICE 710
BUS 702
PROCESSOR 704
COMMUNICATION INTERFACE 718
700
NETWORK LINK 720
728
INTERNET
ISP
726
SERVER 730
LOCAL NETWORK 722
HOST 724

DEFINING AND EXECUTING CUSTOM GENERATIVE ARTIFICIAL INTELLIGENCE AGENT ACTIONS ON SELECTED DATA ITEMS

INCORPORATION BY REFERENCE; DISCLAIMER

Each of the following applications are hereby incorporated by reference: 63/692,522 filed Sep. 9, 2024. The Applicant hereby rescinds any disclaimer of claim scope in the parent application(s) or the prosecution history thereof and advises the USPTO that the claims in this application may be broader than any claim in the parent application(s).

TECHNICAL FIELD

This application relates generally to computer-aided data analysis and graphical user interfaces (GUIs) therefor. More particularly, this application relates to computer-aided data analysis and graphical user interfaces (GUIs) therefor supported by generative artificial intelligence (AI).

BACKGROUND

Generative AI agents are conversational systems powered by large language models (LLMs) trained on vast amounts of text data. These models, sometimes based on transformer architectures, use self-attention mechanisms and deep neural networks to generate human-like responses to user inputs. They operate by predicting the most likely sequence of tokens given a prompt, leveraging patterns learned from their training data. While powerful, these systems often struggle with up-to-date information, factual accuracy, and consistency across interactions due to their reliance on static, pre-trained knowledge.

Data analytics is the technical process of examining, cleaning, transforming, and interpreting large sets of data to uncover patterns, draw conclusions, and support decision making. It involves various techniques and tools from statistics, computer science, and mathematics to extract meaningful insights from raw data. In today's data-driven world, analytics plays an important role in business intelligence, scientific research, and many other fields.

GUIs for data analytics are software applications that provide visual, interactive ways to explore and analyze data. These interfaces typically offer features like data visualization tools, interactive dashboards, and drag-and-drop functionality for creating charts and graphs. GUIs make complex data more accessible and understandable to users who may not have extensive programming or statistical backgrounds. They allow analysts to manipulate data, apply various analytical techniques, and present findings in a visually appealing and intuitive manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

One or more embodiments of the present disclosure are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 is a flowchart of a method for defining a custom generative AI agent action in accordance with an embodiment of the present disclosure;

FIG. 3 is a flowchart of a method for executing a custom generative AI agent action on selected data items in accordance with an embodiment of the present disclosure;

FIG. 4 depicts an example of an action definition interface for defining a custom action in accordance with an embodiment of the present disclosure;

DETAILED DESCRIPTION

Figure 1:
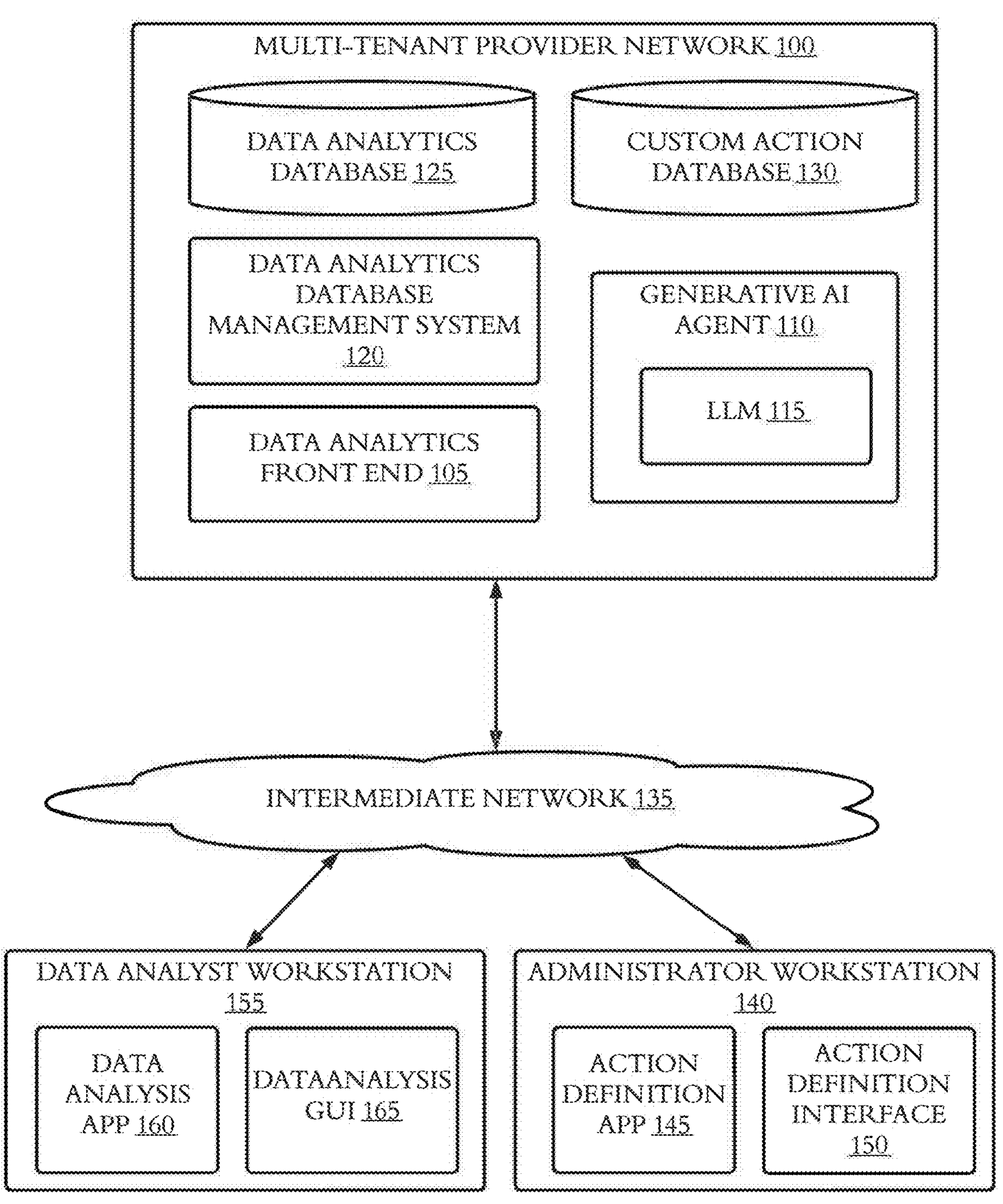
FIG. 1 illustrates an example multi-tenant provider network environment in which techniques for defining and executing custom generative artificial intelligence agent actions on selected data items are implemented in accordance with an embodiment of the present disclosure.

In the following detailed description, for the purposes of explanation, numerous specific details are set forth to aid understanding of one or more embodiments of the present disclosure. In some instances, an embodiment of the present disclosure may be practiced without one or more of these specific details. In some cases, a described feature of one embodiment of the present disclosure is also a feature of one or more other embodiments of the present disclosure even though the feature is not expressly described with respect to the one or more other embodiments. In some embodiments, well-known structures and devices are shown in the figures in block diagram form to avoid unnecessarily obscuring the embodiment.

1. GENERAL OVERVIEW
2. MULTI-TENANT PROVIDER NETWORK ENVIRONMENT
3. METHODS FOR DEFINING AND EXECUTING GENERATIVE AI AGENT ACTIONS ON SELECTED DATA ITEMS
4. EXAMPLE GUIs FOR DEFINING AND EXECUTING GENERATIVE AI AGENT ACTIONS ON SELECTED DATA ITEMS
5. EXAMPLE EMBODIMENTS
6. COMPUTER NETWORKS AND CLOUD NETWORKS
7. HARDWARE OVERVIEW
8. EXTENSIONS; ALTERNATIVES

1. General Overview

One or more embodiments create and execute custom generative AI actions on data items selected within a GUI. A custom action administrator (e.g., a user having credentials to administer custom actions) uses an action definition interface to input a generative AI agent prompt. This prompt includes a natural language query and context variables that are stored as a custom action definition. One or more embodiments then present a GUI displaying multiple data items visually. Data analysts (e.g., users performing data analytics functions) can select a subset of these items, triggering the presentation of an option to execute the previously defined custom action. Upon activation of this option by the data analyst, one or more embodiments assign metadata values from the selected items to the context variables in the generative AI prompt. One or more embodiments then submit the complete prompt to a generative AI agent. The GUI displays the generative AI agent's response, integrating AI-generated insights directly into the data visualization context.

One or more embodiments address several technical challenges by providing a structured approach to integrating generative AI with data analytics GUIs. One or more embodiments allow custom action administrators to define custom actions with AI prompts, creating a flexible interface between the data analytics environment and the AI model, thereby minimizing disruption to existing workflows while adding AI capabilities.

One or more embodiments incorporate context variables into the AI prompt, allowing for dynamic, data-specific queries. This context-aware approach helps maintain relevance and accuracy in the AI's responses and addresses the challenge of ensuring AI outputs are relevant and contextualized. Improved relevance and accuracy of AI responses reduces the overall number of AI prompts needed to obtain a relevant, accurate response. Because processing each AI prompt consumes computational resources (e.g., processor cycles, network bandwidth, memory, etc.), reducing the number of AI prompts results in fewer computational resources being consumed to obtain relevant, accurate responses. Consuming fewer computational resources frees those resources for other system tasks (e.g., services, applications, operating system functions, etc.), improving the overall functioning of the computer system. Without the techniques described herein, more computational resources would be needed to obtain relevant, accurate responses, degrading the overall performance of the computer system.

Regarding the challenge of designing intuitive interfaces for non-technical data analysts, one or more embodiments embed AI interactions within familiar GUI elements. Data analysts can trigger AI actions through standard interface options, making the process accessible without requiring complex configurations or prompt engineering skills. Thus, one or more embodiments provide a technical solution to the technical problem that AI systems generally lack interface options that allow less technically sophisticated users to generate AI prompts that produce relevant, accurate results. Without such interface options, a less sophisticated user may need to submit more AI prompts which, as noted above, degrades overall functioning of the computer system.

One or more embodiments address latency by using a two-step process. The custom action is first defined and stored then executed on-demand. This approach allows for optimized processing and reduces real-time computational demands. Reducing real-time computational demands frees computational resources for other system tasks, improving the overall functioning of the computer system.

One or more embodiments address data privacy concerns by working with metadata rather than raw data. By assigning metadata values to context variables, the system can provide relevant context to the AI without necessarily exposing sensitive information. Thus, one or more embodiments provide a technical solution to the technical problem of avoiding inadvertent exposure of sensitive information to potentially malicious actors.

One or more embodiments improve reproducibility by storing defined actions. This allows for consistent AI interactions across different analysis sessions, addressing the challenge of maintaining version control in AI-augmented analytics environments. Thus, one or more embodiments provide a technical solution to the technical problem of allowing for consistent AI interactions across different analysis sessions.

One or more embodiments conserve computing and LLM resources by employing a structured approach to AI interactions. Unlike general chatbot interfaces where data analysts might submit numerous exploratory queries, one or more embodiments use predefined custom actions. These actions are carefully crafted and stored, reducing ad-hoc, potentially redundant queries. Reducing the number of ad-hod, potentially redundant queries reduces the number of AI prompts needed overall which, as noted above, improves the overall functioning of the computer system.

By allowing custom action administrators to define specific prompts, one or more embodiments ensure that AI interactions are purposeful and aligned with analytical goals. This targeted approach minimizes superfluous queries that could waste computational resources. The use of context variables further optimizes query efficiency. Instead of submitting multiple similar queries with slight variations, a single, well-designed prompt can adapt to different data contexts. As noted above, consuming fewer computational resources frees those resources for other system tasks, improving the overall functioning of the computer system.

One or more embodiments integrate with data selection in the GUI to contribute to resource conservation. Data analysts explicitly choose the data subset for AI analysis, preventing unnecessary processing of irrelevant data. This selective approach ensures that a query to the generative AI agent is intentional and data-driven. Processing less irrelevant data frees the computational resources that would otherwise be needed for such processing which, as noted above, improves the overall functioning of the computer system.

One or more embodiments encourage reuse of defined actions across multiple analysis sessions. This reusability reduces the need for data analysts to formulate new prompts repeatedly, thereby decreasing the overall number of unique queries sent to the AI agent. Decreasing the overall number of unique queries sent to the AI agent results in fewer computational resources being consumed to process those queries which, as noted above, improves the overall functioning of the computer system.

One or more embodiments present AI interactions as GUI options to discourage or obviate the need for casual or exploratory use of the AI agent. Data analysts are more likely to invoke the AI agent when needed for specific analytical tasks, further conserving computational resources compared to open-ended chatbot interfaces.

One or more embodiments described in this Specification and/or recited in the claims may not be included in the General Overview section.

2. Multi-Tenant Provider Network Environment

FIG. 1 illustrates an example multi-tenant provider network environment in which techniques for defining and executing custom generative AI agent actions on selected data items are implemented in accordance with an embodiment of the present disclosure.

A multi-tenant provider network 100 houses several components. A data analytics front end 105 serves as the primary interface for data processing and visualization. The provider network 100 incorporates a generative AI agent 110 equipped with an LLM 115 that enables natural language processing and generation capabilities. Data management is handled by a data analytics database management system (DBMS) 120 in conjunction with a data analytics database 125. Custom action information is stored separately in a dedicated database 130. Alternatively, the custom action information is stored in data analytics database 125.

The provider network 100 connects to external systems via an intermediate network 135. This network 135 facilitates communication with at least two workstations: an administrator workstation 140 and a data analyst workstation 155. The administrator workstation 140 runs an action definition application 145 and presents an action definition interface 150, allowing for the creation and management of custom AI actions. The data analyst workstation 155 executes a data analysis application 160 and displays a data analysis GUI 165, providing tools for data exploration and visualization.

One or more embodiments enable a separation of roles and responsibilities. Administrators can define and manage AI actions centrally, while analysts can leverage these actions in their data exploration processes. The multi-tenant nature of the provider network 100 allows for scalable and secure service provision to multiple clients or organizations simultaneously.

The action definition application 145 on the administrator workstation 140 presents an interface 150 for custom action creation. Through this interface, administrators input a generative AI prompt consisting of a natural language query and context variables. The custom action database 130 stores this definition for future use.

On the data analyst side, the data analytics front end 105 collaborates with the data analysis application 160 to display a GUI 165 on the analyst workstation 155. This GUI presents data items retrieved by the data analytics DBMS 120 from the analytics database 125. Analysts can select a subset of these items through the GUI 165.

One or more embodiments present an option to execute the previously defined custom action on the selected data subset. When an analyst chooses this option, the data analysis application 160 populates the context variables with metadata from the selected items. The application then submits the complete prompt to the generative AI agent 110 within the provider network.

The data analysis application 160 displays the AI agent's response in the GUI 165, integrating the AI-generated insights with the original data visualization.

A multi-tenant provider network 100 is a cloud-based infrastructure designed to serve multiple clients or organizations simultaneously from a single, shared platform. This network architecture leverages economies of scale to efficiently allocate computing resources, storage, and services across various tenants. A tenant operates within a logically isolated environment, ensuring data privacy and security while benefiting from shared underlying hardware and software resources. The provider network 100 may employ virtualization techniques to create these isolated environments, allowing for dynamic resource allocation based on individual tenant needs.

The provider network 100 may incorporate security measures, including data encryption, access controls, and network segmentation, to maintain the integrity and confidentiality of a tenant's data and operations. Scalability may be a salient feature, enabling the network to accommodate growing demands without compromising performance. Load balancing mechanisms may be used to distribute processing tasks across multiple servers to optimize resource utilization and ensure high availability. The provider network 100 may include redundant systems and failover mechanisms to minimize downtime and maintain continuity of service for tenants.

The data analytics front end 105 is a software interface designed to facilitate interaction between users and data analytics systems. This component may serve as the primary point of contact for users, offering a range of tools and visualizations to explore, analyze, and interpret large datasets. The front end may incorporate responsive design principles, ensuring optimal performance across various devices and screen sizes. Data visualization libraries may enable the creation of interactive charts, graphs, and dashboards, that allow users to gain insights through visual representation of complex data relationships.

The front end may integrate with backend analytics engines, translating user queries into appropriate database or API calls. Real-time data processing capabilities may allow for immediate feedback and iterative analysis. The interface may include various features, such as drag-and-drop query builders, customizable report generators, and collaborative tools for sharing insights across teams. Security features may be embedded within the front end, managing user authentication, role-based access controls, and data encryption to protect sensitive information.

The generative AI agent 110 is a computational system designed to produce human-like content or responses based on input prompts or queries. This agent 110 may leverage machine learning techniques, such as deep learning and natural language processing, to understand context and generate coherent, relevant outputs. The generative AI agent 110 may include an LLM 115 that has been trained on vast amounts of text data to recognize patterns and relationships in language.

The agent 110 may employ neural network architectures (e.g., based on transformer models) to process input and generate output. These architectures enable the agent 110 to handle long-range dependencies in text and maintain context over extended sequences. The generative process may involve tokenizing input text, encoding it into high-dimensional vector representations, and then using these representations to predict the most probable next tokens in a sequence. Techniques, such as beam search or nucleus sampling, may be employed to improve the quality and diversity of generated text. The agent 110 can be fine-tuned or prompted to perform a wide range of tasks, including question answering, text summarization, language translation, and creative writing.

The LLM 115 is a neural network architecture designed to process and generate human-like text at scale. LLM 115 may be built using transformer architectures that leverage self-attention mechanisms to capture long-range dependencies in sequential data. The LLM 115 may be trained on massive corpora of text data (e.g., containing billions of tokens), allowing the LLM 115 to learn complex patterns and relationships within language. The LLM 115 may range from billions to hundreds of billions of parameters and may be trained to capture nuanced aspects of language, including context, tone, and even implicit knowledge.

Training the LLM 115 may involve different techniques, such as unsupervised pretraining or supervised fine-tuning. During pretraining, the LLM 115 may learn to predict missing words or next tokens in a sequence, developing a broad understanding of language structure and content. Fine-tuning may adapt the model to specific tasks or domains. The LLM 115 may employ tokenization to convert text into numerical representations and use embedding layers to capture semantic relationships between tokens. The LLM 115 may include multiple transformer layers, each containing self-attention and feed-forward neural networks. These layers may progressively refine the representation of input text, enabling the model to generate contextually appropriate and coherent responses. The LLM 115 may incorporate techniques like few-shot learning, allowing the LLM 115 to adapt to new tasks with minimal task-specific training data.

The data analytics DBMS 120 is a software platform designed to efficiently store, retrieve, and manage large volumes of structured and semi-structured data for analytical purposes. This data analytics DBMS 120 may be optimized for queries and high throughput read operations. The data analytics DBMS 120 may employ indexing techniques, such as bitmap and columnar indexing, to accelerate query performance on large datasets. Partitioning strategies may also be implemented by the data analytics DBMS 120 to distribute data across multiple nodes, enabling parallel processing and improved scalability.

The data analytics DBMS 120 may support Online Analytical Processing (OLAP) operations, facilitating multidimensional analysis of data. The data analytics DBMS 120 may incorporate in-memory processing capabilities to reduce I/O bottlenecks and accelerate complex calculations. The data analytics DBMS 120 may include query optimization engines to analyze and rewrite queries to improve execution efficiency. The data analytics DBMS 120 may also include features for real-time analytics, allowing for the ingestion and analysis of streaming data. Data compression techniques may be employed by the data analytics DBMS 120 to reduce storage requirements and improve query performance. The data analytics DBMS 120 may support a variety of data models, including relational, dimensional, and graph structures, to accommodate diverse analytical needs. The data analytics DBMS 120 may integrate with business intelligence and data visualization tools, enabling seamless data exploration and reporting. The data analytics DBMS 120 may provide security features, such as role-based access control and data encryption, to ensure data protection and compliance with regulatory requirements.

The data analytics database 125 is a repository designed to store and organize large volumes of structured, semi-structured, or unstructured data optimized for analytical processing. This database 125 may employ a schema that facilitates rapid querying and aggregation of data across multiple dimensions. For example, the structure may follow a star or snowflake schema with fact tables containing quantitative metrics surrounded by dimension tables that provide contextual information. Additionally, or alternatively, columnar storage formats may be used to enhance query performance on specific attributes, allowing for efficient compression and faster data retrieval.

The analytics database 125 may incorporate indexing mechanisms to accelerate queries, including, for example, bitmap indexes for low-cardinality columns or inverted indexes for text search capabilities. Partitioning strategies may be implemented by the data analytics database 125 to distribute data across multiple storage units, enabling parallel processing and improved query performance. Data within the analytics database 125 may be denormalized to some degree, trading off storage efficiency for query performance. The data analytics database 125 may also include support for materialized views that pre-compute and store the results of complex queries to enhance response times for common analytical operations. The data analytics database 125 may support a distributed architecture that can grow horizontally to accommodate increasing data volumes and analytical demands.

The custom AI action database 130 is a storage system designed to manage and facilitate the execution of user-defined, AI-driven operations within a larger analytics ecosystem. The custom AI action database 130 stores structured representations of AI actions, including natural language queries, context variables, and execution parameters. The schema of the custom AI action database may be optimized for quick retrieval and parsing of action definitions such as by employing indexing strategies tailored to the specific structure of AI prompts and associated metadata.

The custom AI action database 130 may incorporate versioning capabilities to track changes in action definitions over time, enabling rollback and audit functionalities. Access control mechanisms may be implemented by the custom AI action database 130 to manage permissions for creating, modifying, and executing custom AI actions, ensuring security and compliance with organizational policies. The custom AI action database 130 may employ caching strategies to improve performance for frequently accessed actions. The custom AI action database 130 may integrate with the broader analytics system to allow for dynamic population of context variables based on selected data subsets. Serialization and deserialization methods may be implemented by the custom AI action database 130 to efficiently store and retrieve action structures that may include nested parameters or conditional logic. The custom AI action database 130 may include features for tagging and categorizing that facilitate organization and discovery of relevant AI operations within large enterprises.

The intermediate network 135 serves as a communication infrastructure that bridges the multi-tenant provider network 100 with external client workstations. The network 135 may employ a variety of protocols and technologies to ensure secure, efficient, and reliable data transmission between disparate systems. The intermediate network 135 may utilize high-bandwidth connections, leveraging fiber optic or advanced wireless technologies, to minimize latency and support high-volume data transfers.

The intermediate network 135 may implement multiple layers of protection. These may include encryption protocols, such as SSL/TLS for data in transit, firewalls to filter traffic, and intrusion detection systems to identify and mitigate potential threats. The network 135 may incorporate load balancing mechanisms to distribute traffic evenly across multiple paths, ensuring optimal performance and preventing bottlenecks. Quality of Service (QoS) policies may be implemented within the network 135 to prioritize critical data flows, such as real-time analytics queries or AI model responses. The intermediate network 135 may be designed with redundancy in mind, featuring failover systems and alternate routing paths to maintain connectivity in the event of hardware failures or network congestion.

The administrator workstation 140 is a computing environment designed for system management and configuration tasks within the multi-tenant provider network ecosystem. This workstation 140 may be equipped with high-performance hardware, typically featuring multi-core processors, ample RAM, and fast, solid-state storage to handle resource-intensive administrative tasks efficiently. The operating system may be a hardened, enterprise-grade platform with advanced security features and support for remote management protocols. Connectivity to the multi-tenant provider network 100 is established through secure, encrypted channels, such as by utilizing VPN technology or dedicated administrative interfaces.

The action definition application 145 is a software tool designed for creating, modifying, and managing custom AI actions within the multi-tenant provider network environment. This application 145 provides a set of features for defining complex AI prompts, specifying context variables, and configuring execution parameters. The user interface may employ a combination of visual programming elements and text-based editors that allow administrators to construct AI actions through both graphical and code-based methods.

The action definition application 145 may incorporate validation mechanisms to ensure the syntactic and semantic correctness of defined actions. Integration of the action definition application with the generative AI agent 110 may enable real-time testing and preview of action outcomes. Version control functionality may be built into the action definition application 145, facilitating collaborative development and tracking changes over time. The action definition application 145 may include a template library, offering pre-configured action structures that can be customized for specific use cases. Advanced features may include a debugger for troubleshooting complex actions and a performance profiler to optimize execution efficiency. The action definition application 145 may support exporting and importing action definitions, enabling cross-environment deployment and backup. Security features may be embedded in action definition application 145, including role-based access controls and audit logging of definition changes. The action definition application 145 may be designed to scale, supporting the creation and management of large numbers of custom AI actions across multiple tenants or organizational units.

The action definition interface 150 is a GUI designed to facilitate the creation and management of custom AI actions within the multi-tenant provider network environment. This interface presents a set of tools and visual elements that enable administrators to define, edit, and organize AI prompts and their associated parameters. The layout may feature a multi-pane or multi-page design, incorporating areas for prompt composition, context variable definition, and execution parameter configuration.

Dynamic form generation may be employed to guide users through the process of defining different action types with input validation occurring in real-time to ensure data integrity. The interface 150 may include a visual flow designer for creating complex, multi-step AI actions, allowing administrators to chain prompts and define conditional logic. Syntax highlighting and auto-completion features may be integrated to assist in crafting accurate and efficient prompts. The action definition interface 150 may provide a preview pane where administrators can test actions with sample data and view generated outputs. Version control capabilities may be built into the interface 150, allowing users to track changes, compare versions, and roll back to previous states if necessary. The interface 150 may also incorporate collaborative features, such as commenting and shared editing, to facilitate team-based action development. Accessibility considerations may be implemented, ensuring the interface 150 is usable with assistive technologies and complies with relevant standards.

The data analyst workstation 155 is a computing environment optimized for data exploration, analysis, and visualization tasks. This workstation 155 may feature high-performance hardware, including multi-core processors, substantial RAM, and dedicated graphics processing units to handle complex analytical operations and render sophisticated visualizations smoothly. The workstation 155 may be equipped with large, high-resolution displays to facilitate the simultaneous viewing of multiple data representations and analytical tools.

Software configurations on the data analyst workstation 155 may include a suite of statistical analysis tools, data manipulation libraries, and visualization packages. These may include popular programming environments, such as R or Python, along with integrated development environments (IDEs) tailored for data science workflows. The workstation 155 may be configured with high-speed network interfaces to ensure rapid data retrieval and query execution against remote databases and data lakes.

The data analysis application 160 is a software suite designed to facilitate the exploration, manipulation, and interpretation of complex datasets. This application 160 may integrate various analytical tools and methodologies within a unified interface, enabling data analysts to perform a wide range of operations efficiently. The functionality of the data analysis application 160 may include data importation modules supporting multiple file formats and database connections along with data cleaning and preprocessing capabilities to ensure data quality and consistency.

Advanced statistical analysis features may be incorporated in the data analysis application 160, ranging from descriptive statistics to complex inferential models and machine learning algorithms. The application 160 may include a query builder with support for SQL and other data manipulation languages, allowing analysts to extract and transform data dynamically. Visualization components of the data analysis application 160 may offer a diverse array of chart types and customization options to represent data graphically. These visualizations may be interactive, supporting drill-down capabilities and real-time data exploration. The application 160 may incorporate features for automated report generation, scheduling of recurring analyses, and collaboration tools for sharing insights across teams. The application 160 may integrate with external tools and libraries, such as R or Python scripts. The data analysis application 160 may incorporate performance optimization techniques, including in-memory processing and parallel computation, to handle large-scale datasets efficiently. The data analysis application 160 may include security features, such as role-based access controls and data encryption, to protect sensitive information throughout the analytical process.

The data analysis GUI 165 is a GUI designed to provide intuitive access to analytical tools and data visualization capabilities. This interface 165 may employ a modular architecture, featuring customizable dashboards and workspaces that allow users to arrange analytical components according to their specific workflows. The GUI 165 may incorporate drag-and-drop functionality for dataset manipulation, enabling users to easily combine, filter, and transform data sources without extensive coding knowledge.

Interactive data visualization may be a feature of the data analysis GUI 165, offering a range of chart types and graphing options that update in real-time as users manipulate underlying data or parameters. The interface 165 may include a query builder with visual elements for constructing complex database queries, abstracting SQL or other query languages into more user-friendly representations. Advanced features may include interactive pivot tables, heat maps, and geospatial visualizations. The GUI 165 may provide contextual menus and toolbars that adapt based on the current analysis context, streamlining access to relevant functions. Collaboration features may be integrated, allowing multiple users to share and annotate analyses in real-time. The interface 165 may also incorporate AI-assisted elements, such as the custom AI actions disclosed herein, natural language query inputs, or automated insight generation. Accessibility considerations may be implemented, ensuring the GUI 165 is navigable via keyboard shortcuts and compatible with screen readers. Performance optimization techniques, such as lazy loading and efficient data caching, may be employed to maintain responsiveness when dealing with large datasets or complex visualizations.

In one or more embodiments, a machine learning algorithm is an algorithm that can be iterated to train a target model f (e.g., LLM 115) that best maps a set of input variables to an output variable. In particular, a machine learning algorithm is configured to generate and/or train a target model.

A machine learning algorithm is an algorithm that can be iterated to train a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, the techniques disclosed herein are implemented on one or more digital devices (e.g., data analyst workstation 155 or administrator workstation 140). The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, an interface (e.g., data analysis GUI 165 or action definition interface 150) refers to hardware and/or software configured to facilitate communications between a user and computer system. Interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of an interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, an interface is specified in one or more other languages, such as Java, C, or C++.

In one or more embodiments, a tenant of multi-tenant provider network 100 is a corporation, organization, enterprise or other entity that accesses a shared computing resource, such as data analytics front end 105 or generative AI agent 110. In an embodiment, tenants of multi-tenant provider network 100 have a degree of independence from each other. A business or operation of one tenant of the multi-tenant provider network 100 is separated to a degree by the multi-tenant provider network 100 from a business or operation of another tenant of the multi-tenant provider network 100.

While some embodiments such as depicted in FIG. 1 the same multi-tenant provider network provides, operates, or places into service all of the data analytics front end 105, generative AI agent 110, LLM 115, data analytics database management system 120, data analytics database 125, custom action database 130, action definition application 145, action definition interface 150, data analysis application 160, and data analysis GUI 165, multiple multi-tenant provider networks are involved in other embodiments. For example, one multi-tenant provider network can provide, operate, or place into service all of data analytics front end 105, data analytics database management system 120, data analytics database 125, custom action database 130, action definition application 145, action definition interface 150, data analysis application 160, and data analysis GUI 165 and another multi-tenant provider network can provide generative AI agent 110 and LLM 115.

3. Methods for Defining and Executing Custom Generative AI Agent Actions on Selected Data Items FIG. 2 is a flowchart 200 of a method for defining a custom generative AI agent action in accordance with an embodiment of the present disclosure. An action definition interface allows users to create custom actions by specifying a generative AI prompt. This prompt includes a natural language query and context variables. The system stores the custom action definition based on this input.

One or more embodiments present an action definition interface to a user (Operation 202). This interface serves as a tool for users to define custom actions, offering input fields and configuration options. The system captures user input through this interface (Operation 204). Specifically, the user provides input corresponding to at least two elements: (1) a natural language query, and (2) one or more context variables. The natural language query forms the core of the AI prompt, while the context variables allow for dynamic, data-driven inputs based on selected data items. These variables enable the prompt to adapt based on the specific data subset selected later. This sequence concludes by storing the custom action definition (Operation 206). The system receives the user's input and creates a persistent record of the custom action, including the generative AI agent prompt. This storage step is useful for later retrieval and execution of the custom action within the data analysis workflow.

FIG. 3 is a flowchart 300 of a method for executing the custom generative AI agent action on selected data items in accordance with an embodiment of the present disclosure. A GUI displays a visual representation of multiple data items (Operation 302). A user can select a subset of these items within the GUI (Operation 304). The interface then presents an option to execute the previously defined custom action on the selected subset (Operation 306). Responsive to user selection of this option (Operation 308), the system assigns metadata values from the chosen items to the context variables in the prompt (Operation 310). The system submits the complete prompt, including the natural language query and populated context variables to a generative AI agent (Operation 312). The GUI displays the AI agent's response to the prompt (Operation 314), providing context-aware insights directly within the data analysis workflow.

The flowchart 300 of FIG. 3 describes the execution process of the previously defined custom action within a data analysis context. The sequence is initialized by presenting a graphical user interface (GUI) that visualizes multiple data items (Operation 302). This GUI serves as the primary interaction point for data exploration. The GUI allows the selection of a specific subset of data items (Operation 304). This selection narrows the scope for subsequent analysis.

The system leverages the stored custom action definition to present an execution option within the GUI, specifically tailored for the selected data subset (Operation 306). The system captures the user's decision to proceed with the custom action (Operation 308). Responsive to this confirmation, the action execution includes mapping metadata values from the selected data items to the predefined context variables (Operation 310). This step effectively initializes the context variables with relevant, selection-specific data.

The system submits the complete generative AI agent prompt to an AI service (Operation 312). This prompt combines the natural language query with the newly initialized context variables, providing a context-aware input for the AI. The system presents the AI-generated response within the GUI, thus integrating AI-driven insights into the user's data analysis workflow (Operation 314).

4. Example Graphical User Interfaces for Defining and Executing Custom Generative AI Agent Actions on Selected Data Items FIG. 4 depicts an example of an action definition interface 400 for defining a custom action in accordance with one or more embodiments of the present disclosure. In this example, the custom action administrator has provided input that defines a generative AI Agent prompt including (a) a natural language query (e.g., "Can you summarize the following information about a kubernetes system?") and (b) one or more context variables that provide context for the natural language query (e.g., "$Node," "$Container", "$ContainerPods", "$Namespace", "$KubernetesClusterName," "$Pod", and "$Status").

Figure 5:
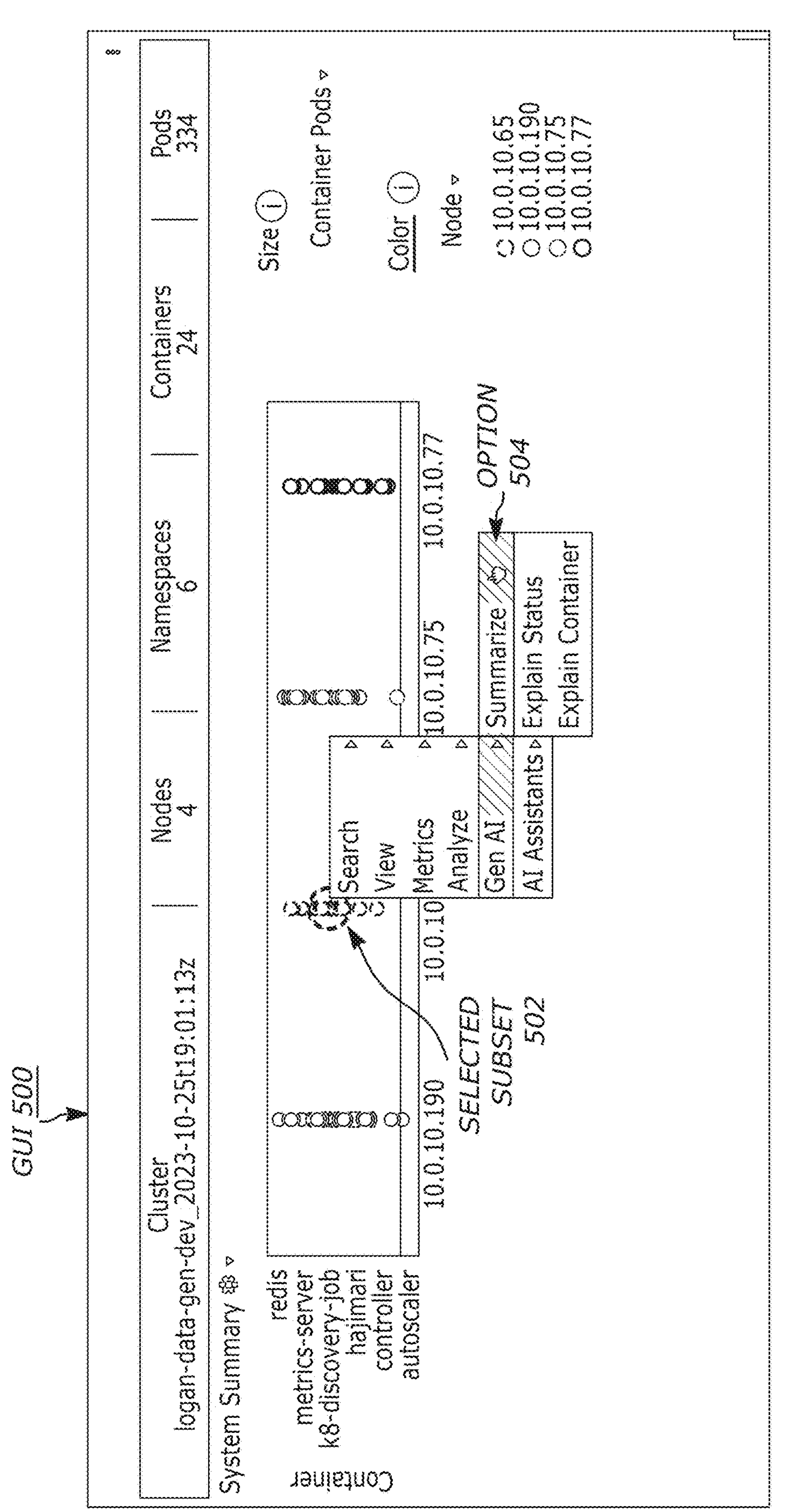
FIG. 5 depicts an example GUI for executing a custom action in accordance with an embodiment of the present disclosure.

FIG. 5 depicts a first example GUI 500 for executing the custom action defined via the action definition interface 400 in accordance with an embodiment of the present disclosure. GUI 500 includes a visual representation of multiple data items in the form of a chart. The data items are determined by executing a data analytics query against a data analytics database. The y-axis of the chart represents containers deployed in a Kubernetes cluster, and the x-axis of the chart represents various nodes of the cluster. A "bubble" (colored circles) in the chart for a container-node pair represents a data item associated with the pair. For example, the size of the bubble for a container-node pair may represent a number of logged errors that have occurred with the respective container on the respective node during a period of time.

In this example, the data analyst has selected one of the bubbles (selected subset 502) such as, for example, by using a mouse or other pointing device or a touch sensitive surface to select or click on the bubble. In response, based on the stored definition of the custom action defined in the example of FIG. 4, the GUI 500 presents option 504 to execute the custom action for the subset of the data items. While in this example, the data analyst has selected one data item, the techniques are not so limited, and the data analyst could have selected multiple data items to summarize using the custom action, such as, for example, by clicking and holding a mouse button while dragging a shape around the target data items or by selecting multiple data items while holding the "Shift" key. Once the set of one or more data items are selected, then the data analyst may right-click the mouse or select a hot-key to reveal the option 504.

Figure 6:
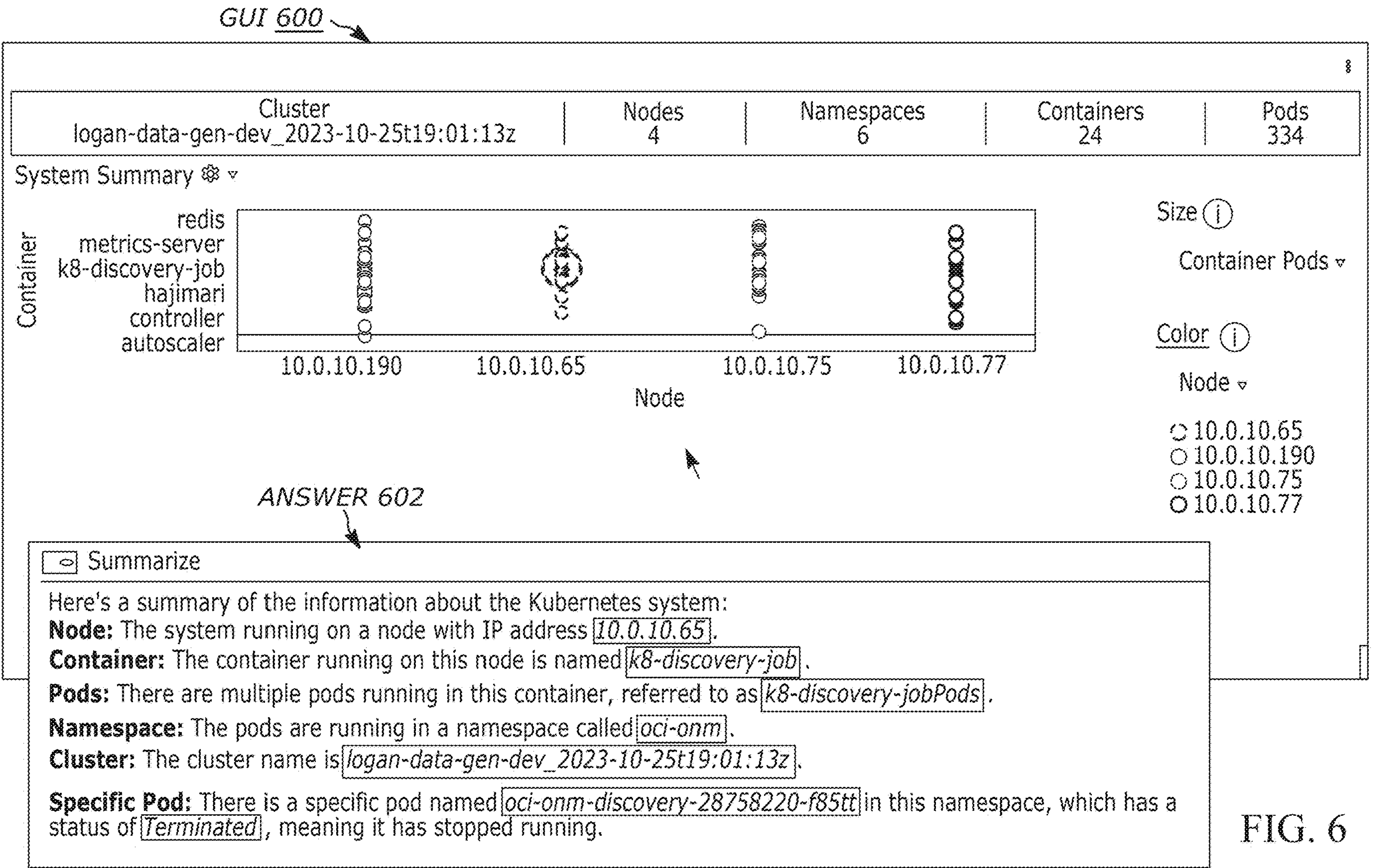
FIG. 6 depicts an example GUI for executing a custom action in accordance with an embodiment of the present disclosure.

FIG. 6 depicts a second example GUI 600 for executing the custom action in accordance with an embodiment of the present disclosure. GUI 600 may be presented in response to selecting option 504 in GUI 500 of FIG. 5. Also, in response to selecting option 504 in GUI 500 of FIG. 5, values of metadata associated with the selected subset 502 of the data items are assigned to the context variables specified via the action definition interface 400 of FIG. 4. The generative AI agent prompt defined via the action definition interface 400 of FIG. 1, comprising the natural language query and the one or more context variables with the values of the metadata associated with the selected subset 504 assigned, is submitted to a generative AI agent. The answer 602 to the complete prompt generated by the generative AI agent is presented in the GUI 600, thereby providing generative AI-assisted context.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

As an example, a custom action administrator may define a custom action through the action definition interface. The admin may create a generative AI agent prompt: "Analyze the {metric_name} trend for {time_period} and suggest potential causes for any anomalies. Consider typical patterns for {day_of_week}." The variables {metric_name}, {time_period}, and {day_of_week} serve as context variables. Later, a GUI presents a line graph to a data analyst showing server response times over the past week, resulting from a log analytics query. The data analyst selects a portion of the graph, where response times spike abnormally. This selection represents the subset of data items. The GUI then offers an option to execute the predefined custom action "Analyze Anomalies" for the selected data range. Upon activation by the data analyst, one or more embodiments assign values to the context variables as follows: {metric_name} becomes "server response time", {time_period} becomes "Tuesday 2 PM to 8 PM", and {day_of_week} becomes "Tuesday". One or more embodiments submit the complete prompt to the generative AI agent. The agent processes the request and returns an analysis: "The server response time spike on Tuesday between 2 PM and 8 PM is atypical. Potential causes could include: 1) Scheduled backup processes consuming resources, 2) An unplanned traffic surge, possibly from a marketing campaign, 3) A software deployment introducing performance issues. Tuesdays typically show stable performance, making this anomaly significant." The GUI then displays this AI-generated analysis alongside the original response time graph, providing context-aware insights for the selected anomaly to the data analyst.

One or more embodiments introduce a role-based access control system to the custom action definition and execution process. This approach differentiates between two types of users based on their credentials. The first user, possessing elevated privileges, is granted access to the action definition interface. This user has the authority to create and define custom actions, including the formulation of generative AI agent prompts. This user is sometimes referred to herein as the "custom action administrator." In contrast, the second user operates with more limited permissions. While unable to define custom actions, this user retains the ability to interact with the GUI, select data subsets, and execute pre-defined custom actions. This user is sometimes referred to herein as the "data analyst." One or more embodiments establish a hierarchical structure within the system, separating the responsibilities of action creation from action execution.

For example, Sarah, a senior data analyst with administrative privileges, accesses the action definition interface. Using her credentials, she creates the custom action "Analyze Anomalies" with the generative AI agent prompt: "Analyze the {metric_name} trend for {time_period} and suggest potential causes for any anomalies. Consider typical patterns for {day_of_week}." Later, John, a junior analyst without action definition privileges, uses the log analytics GUI. He views the same line graph of server response times over the past week. John selects the portion of the graph showing the abnormal spike in response times. Although John cannot create or modify custom actions, he sees the "Analyze Anomalies" option that Sarah defined. John selects this option for his chosen data subset. The system then processes his request, populating the context variables and submitting the query to the generative AI agent.

John receives the AI-generated analysis in his GUI, gaining insights into the anomaly without needing the elevated permissions required to create custom AI actions.

One or more embodiments are specific to distributed systems and log analytics, where the data items under analysis correspond to multiple services deployed across various nodes in a multi-node system, such as a KUBERNETES clusters or other container orchestration cluster. Such a setup is common in large-scale, distributed computing environments, where services are spread across multiple machines or containers for improved performance, reliability, and scalability. One or more embodiments associate these services with a log analytics system. Log analytics systems collect, aggregate, and analyze log data from multiple sources across a distributed infrastructure. One or more embodiments enable data analysts to apply custom generative AI actions to analyze log data from multiple services simultaneously, providing a comprehensive view of system behavior.

Consider a large e-commerce platform running on a multi-node system. The platform consists of various microservices: a product catalog service, an order processing service, and a user authentication service. A service is deployed across multiple nodes for load balancing and redundancy. A log analytics system collects data from these services across nodes, and a data analytics query generates a graph showing the average response times for each service over the past 24 hours. A data analyst notices an anomaly in the graph and selects a time range where the order processing service shows significantly higher response times compared to other services. This selection represents the subset of data items corresponding to multiple services (product catalog, order processing, user authentication) deployed across multiple nodes. The analyst chooses to execute the previously defined "Analyze Anomalies" custom action. One or more embodiments submit the generative AI agent prompt, enriched with context from logs across multiple services and nodes. The AI agent's response might read: "Analysis of the order processing service shows elevated response times between 2 PM and 4 PM across nodes. Logs indicate increased database query times coinciding with this period. Cross-referencing with other services suggests a potential database bottleneck affecting the order processing service most severely. Recommend investigating recent changes to database schemas or query patterns in the order processing service."

One or more embodiments extend the functionality of the custom action definition process. This extension allows custom action administrators to select a specific generative AI agent from multiple available endpoints when defining the custom action. Notably, one or more embodiments introduce flexibility by not limiting the endpoints to Large Language Model (LLM) based systems. At least one of the provided endpoints utilizes a different technology or approach for generating responses. This diversification of endpoint types enables custom action administrators to leverage various technologies, each potentially suited for different analytical tasks or data types. The inclusion of non-LLM endpoints broadens the system's capabilities, potentially incorporating rule-based systems, statistical models, or other machine learning paradigms.

For example, the following endpoints may be offered: (1) GPT-4 (LLM-based), (2) BERT-QA (LLM-based), (3) Random Forest Classifier (non-LLM), and (4) Time Series Forecasting Model (non-LLM). A custom action administrator may want to create a custom action to analyze network traffic patterns and identify potential threats. To do this, the custom action administrator may access the action definition interface and define a natural language query: "Analyze the selected network traffic data and identify any unusual patterns that might indicate a security threat." The custom action administrator may specify context variables such as the following context variable with associated short descriptions:

$timestamp: Time of the traffic
$source_ip: Source IP address
$destination_ip: Destination IP address
$protocol: Network protocol used
$packet_size: Size of the data packet For the endpoint, the custom action administrator may select the Random Forest Classifier instead of an LLM-based option. The custom action administrator may make this choice because the Random Forest model may be specifically trained on historical network traffic data, can quickly process large volumes of structured data, and excels at identifying anomalies in network traffic patterns. The custom action administrator saves the custom action by interacting with the action definition interface. When analyzing network logs, a data analyst can now select a subset of traffic data and run this custom action. The Random Forest Classifier processes the selected data using the context variables to structure its input. The classifier returns results identifying potential security threats that are then displayed in the GUI alongside the original network traffic visualization.

One or more embodiments enhance the custom action definition process by introducing container-based execution in a cloud environment. This approach allows custom action administrators to select a specific container from multiple available options when defining the custom action. Containers that encapsulate the runtime environment along with the application code provide consistency and portability across different computing environments. By leveraging a cloud-based container infrastructure, one or more embodiments offer scalable and isolated execution environments for different AI agents or models. This containerization strategy enables efficient resource allocation, improves security through isolation, and facilitates version control of AI models and their dependencies. One or more embodiments provide the custom action administrator the ability to choose from various containers where the different containers are optimized for specific types of AI tasks, data processing requirements, or performance needs.

One or more embodiments offer a range of containerized AI environments for custom action administrators to choose from when defining custom actions. These containers are optimized for different types of AI tasks and data processing requirements. For example, a custom action administrator working on a project to analyze customer sentiment from social media data may want to create a custom action that uses a generative AI model to summarize sentiment trends and generate insights. When defining this custom action in the action defining interface, one or more embodiments present a dropdown menu of available containers to the custom action administrator in the interface. For example, the set of available containers might include the following with associate short descriptions:

(1) NLP-Optimized Container: Pre-configured with popular NLP libraries and optimized for text processing tasks;

(2) High-Performance Computing Container: Designed for computationally intensive AI tasks, with access to GPU resources;

(3) Multilingual Analysis Container: Equipped with language detection and translation capabilities for processing text in multiple languages; and (4) Time Series Analysis Container: Specialized for analyzing temporal data patterns.

The custom action administrator might select the NLP-Optimized Container as being well suited for their sentiment analysis task. The custom action administrator may then proceed to define the generative AI prompt, specifying the natural language query and context variables related to the social media data. When a data analyst later executes this custom action on a selected subset of social media data, one or more embodiments launch an instance of the NLP-Optimized Container in a cloud environment. The container loads the specified generative AI model and executes the prompt with the provided context. The results are then returned to the interface and displayed to the data analyst alongside the original data visualization. This approach allows for efficient, scalable, and tailored execution of AI tasks within a data analytics platform.

One or more embodiments extend the custom action definition process by introducing data transformation capabilities. This enhancement allows users to specify one or more transformations to be applied to the context variables before the generative AI prompt is submitted to the AI agent. These transformations serve as preprocessing steps, potentially altering the format, structure, or content of the context variables. By enabling such transformations, one or more embodiments provide users with greater control over the input data fed into the AI model. Transformations could include operations like normalization, aggregation, filtering, or format conversion. This preprocessing step can improve the quality and relevance of the AI's output by ensuring that the input data is in an optimal format for the specific AI model or task at hand.

For example, consider a custom action administrator that desires to create a custom action to generate insights about stock price movements. The administrator may define a generative AI prompt with context variables including $stock_symbol, $price_data, and $trading_volume. However, the raw data may need some preprocessing to be most effective for the AI model.

Using the action definition interface of one or more embodiments, the custom action administrator might specify the following transformations:

For $stock_symbol: A simple uppercase conversion to ensure consistency;

For $price_data: A normalization transformation that converts raw price values to percentage changes from the opening price; and For $trading_volume: A logarithmic transformation to handle the wide range of volume values more effectively.

The custom action administrator may also add a new derived variable, $volatility, calculated as the standard deviation of price changes over a rolling 30-day window according to one or more embodiments. When the custom action is executed, one or more embodiments apply these defined transformations to the selected data. The $stock_symbol is converted to uppercase. The $price_data is transformed into percentage changes. The $trading_volume undergoes logarithmic transformation. The new $volatility variable is computed using the specified calculation. Ater these transformations are applied one or more embodiments submit the processed data along with the natural language query to the generative AI agent. The AI then generates insights based on this preprocessed data, potentially producing more relevant and accurate analysis of stock price movements.

One or more embodiments utilize multiple charts to display different subsets of the data items. For example, the GUI may incorporate a first chart and a second chart. The first chart may represent a first subset of the data items, while the second chart may represent a second subset of the data items. This multi-chart approach allows for simultaneous visualization of distinct data groups within the same interface. By presenting data in this manner, one or more embodiments facilitate comparative analysis and provide data analysts with a more comprehensive view of the dataset.

One or more embodiments expand the concept of data subset selection. By incorporating multiple charts, such as a first chart and a second chart, one or more embodiments demonstrates that the subset of data items can span across different visual representations. Data analysts are not limited to selecting data from a single chart or visualization. Instead, one or more embodiments allow for a more flexible and comprehensive selection process. For example, a data analyst could choose data points from the first chart representing one subset of items, then include additional data points from the second chart representing another subset. This cross-chart selection capability enables data analysts to create custom subsets that draw from diverse data groupings or categories. The multi-chart approach thus enhances the data analyst's ability to contextualize and compare data across different subsets, potentially leading to more nuanced and insightful generative AI queries.

Consider a log analytics system for a large e-commerce platform. The GUI might present two charts; the first chart displays hourly website traffic over the past week, while the second chart shows the distribution of HTTP response codes for the same period. A data analyst investigating a potential issue might select a spike in traffic from the first chart and simultaneously selects a cluster of 500-series error codes from the second chart. This cross-chart selection forms the subset of data items for analysis. The data analyst then invokes a custom generative AI action, prompting the AI to explain the correlation between the traffic spike and the increase in server errors. One or more embodiments assign relevant metadata from both charts to context variables, such as the timestamp of the traffic spike and the frequency of specific error codes. One or more embodiments submit these context-enriched prompts to the generative AI agent. The agent's response, which might identify a database bottleneck as the root cause, is displayed within the GUI, providing immediate, data-driven insights derived from the multi-chart selection.

One or more embodiments extend the functionality by introducing an iterative interaction capability with the generative AI agent. This extension allows data analysts to engage in a more dynamic and exploratory analysis process. After receiving the initial response from the AI agent, one or more embodiments enable data analysts to input a natural-language follow-up question. This follow-up question is then submitted to the same generative AI agent that provided the first answer. The AI agent processes this new query and generates a second response. One or more embodiments then present this second answer within the GUI, maintaining the context of the ongoing analysis. This iterative approach facilitates a more in-depth exploration of the data and allows users to drill down into specific aspects of the initial AI-generated insights.

For example, consider a cybersecurity data analyst using a log analytics system to investigate a potential data breach. The data analyst may initially select a subset of unusual network traffic patterns and execute a custom AI action to analyze these patterns. The generative AI agent provides an initial response, highlighting a series of encrypted data transfers to an unfamiliar IP address. Intrigued by this finding, the data analyst may input a natural language follow-up question: "What is the geographical location of this IP address, and have we seen any similar patterns in the past month?" One or more embodiments submit this query to the AI agent that then accesses additional context from the network logs. The AI agent's second response, displayed in the GUI, might reveal that the IP address is in a country known for cyber-attacks and that similar patterns were observed sporadically over the past three weeks but at a much lower frequency.

When submitting the natural-language follow-up question to the generative AI agent, one or more embodiments resubmit one or more context variables to maintain continuity and relevance in the analysis. In the cybersecurity example, one or more embodiments could resubmit context variables, such as the time range of the initial analysis, the specific network protocols involved, and the unusual IP address identified in the first response. These resubmitted variables provide useful context for the follow-up question about geographical location and historical patterns. By including this contextual information, the AI agent can formulate a more accurate and pertinent response. The resubmission of context variables ensures that the AI's analysis remains grounded in the specific dataset and timeframe under investigation. This approach allows the AI to draw connections between the initial findings and the new query, potentially uncovering deeper insights about the suspected cyber-attack.

One or more embodiments introduce an additional layer of data retrieval and processing to enhance the context provided to the generative AI agent. One or more embodiments involve generating a non-LLM (non-Large Language Model) query based on the natural language query provided by the custom action administrator. The non-LLM query is specifically designed to retrieve certain metadata values associated with the subset of data items selected by the data analysts. Once formulated, this non-LLM query is submitted to a separate non-LLM system that could be a traditional database, a data warehouse, or another specialized data storage and retrieval system. The non-LLM system processes the query and returns the requested metadata values. These retrieved metadata values are then incorporated into the context variables that are submitted along with the natural language query to the generative AI agent. By leveraging a non-LLM system to obtain additional metadata, one or more embodiments enrich the context available to the AI agent.

Consider a financial data analyst using a log analytics system to investigate suspicious transaction patterns. The data analyst selects a subset of unusual transactions and invokes a predefined custom action with a natural language query of "Analyze these transactions for potential money laundering activities" as specified by the custom action administrator that created the predefined custom action. Based on this query, one or more embodiments generate a non-LLM SQL query to retrieve specific metadata from a relational database. This SQL query might fetch detailed information, such as transaction amounts, frequency, involved parties, and historical account activities for the selected transactions. The non-LLM database system executes this query, returning precise numerical and categorical data. One or more embodiments incorporate these retrieved metadata values into the context variables submitted to the generative AI agent along with the original natural language query. The AI agent can now leverage both the custom action administrator's high-level question and the granular transaction details to provide a more comprehensive analysis of potential money laundering patterns.

One or more embodiments introduce an advanced machine learning component to automate and enhance the process of generating non-LLM queries. One or more embodiments involve training a specialized machine learning model to translate natural language queries into corresponding non-LLM queries for metadata retrieval. The training process utilizes a dataset of paired natural language queries and their corresponding non-LLM queries, such as SQL or NoSQL queries, as examples. Through this training, the model learns to identify key elements in natural language queries and map them to appropriate database fields, query structures, and operations. The trained model can then generalize this knowledge to generate appropriate non-LLM queries for new, unseen natural language inputs.

For example, a healthcare analytics system may be trained on a dataset of natural language queries paired with corresponding SQL queries for retrieving patient metadata. When defining a custom action, a customer action administrator may specify the natural language query: "Find average blood pressure readings for diabetic patients over 50 in the last six months." The trained machine learning model processes this query, identifying key elements, such as "blood pressure," "diabetic," "over 50," and "last six months." Based on its training, the model generates an SQL query that joins relevant tables, applies appropriate filters for age and diabetes diagnosis, calculates average blood pressure, and limits the timeframe to the last six months. This generated SQL query is then executed on the healthcare database, retrieving precise metadata about the specified patient group. The retrieved metadata is incorporated into the context for the generative AI agent, allowing it to provide a comprehensive analysis of blood pressure trends in this specific patient population.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
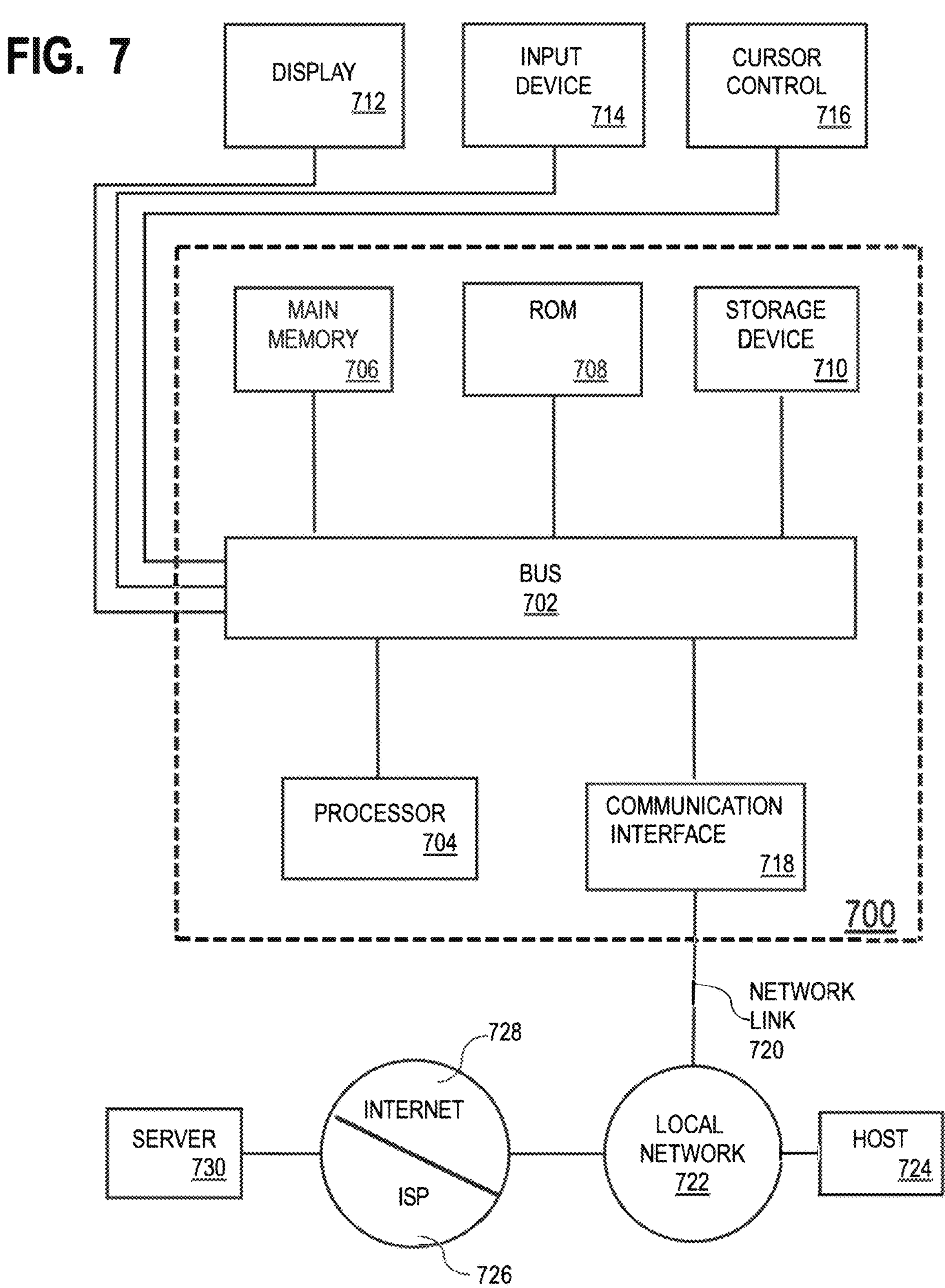
FIG. 7 illustrates a block diagram of a computer system in accordance with one or more embodiments.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or a Solid State Drive (SSD) is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. One or more non-transitory computer-readable media comprising instructions which, when executed by one or more hardware processors, cause performance of operations comprising:

presenting an action definition interface for defining a custom action;

receiving, via the action definition interface, first user input that defines a generative artificial intelligence (AI) agent prompt comprising: (a) a natural language query; and (b) two or more context variables that provide context for the natural language query;

based at least in part on the first user input, storing a definition of the custom action comprising the generative AI agent prompt;

presenting a graphical user interface (GUI) comprising a visual representation of a plurality of data items;

receiving, via the GUI, second user input that selects two or more data items of the plurality of data items;

based on the stored definition of the custom action: presenting, in the GUI, an option to execute the custom action for the two or more data items of the plurality of data items;

receiving, via the GUI, third user input selecting the option to execute the custom action for the two or more data items of the plurality of data items;

responsive to receiving the third user input:

assigning values of metadata associated with the two or more data items of the plurality of data items to the two or more context variables to yield two or more initialized context variables;

submitting the generative AI agent prompt, comprising the natural language query and the two or more initialized context variables, to a generative AI agent; and presenting, in the GUI, a first answer received from the generative AI agent in response to the generative AI agent prompt.

2. The one or more non-transitory computer-readable media of claim 1:

wherein presenting the action definition interface is performed for a first user who has credentials to define the custom action; and wherein receiving the second user input that selects the two or more data items of the plurality of data items is performed for a second user who does not have credentials to define the custom action.

3. The one or more non-transitory computer-readable media of claim 1:

wherein the two or more data items of plurality of data items correspond to a plurality of services deployed respectively to a plurality of nodes in a multi-node system, wherein the plurality of services is associated with a log analytics system.

4. The one or more non-transitory computer-readable media of claim 1, wherein the first user input selects the generative AI agent from a plurality of endpoints, wherein at least one of the plurality of endpoints is not LLM-based.

5. The one or more non-transitory computer-readable media of claim 1, wherein the first user input selects a container for executing the generative AI agent prompt from a plurality of containers in a cloud environment.

6. The one or more non-transitory computer-readable media of claim 1, wherein the first user input defines one or more transformations to apply to the two or more initialized context variables before submitting the generative AI prompt to the generative AI agent.

7. The one or more non-transitory computer-readable media of claim 1, wherein the visual representation of the plurality of data items comprises a first chart that represents a first two or more data items of the plurality of data items and a second chart that represents a second two or more data items of the plurality of data items.

8. The one or more non-transitory computer-readable media of claim 7, wherein the second user input comprises selections from both the first chart and the second chart.

9. The one or more non-transitory computer-readable media of claim 1, the operations further comprising:

receiving fourth user input comprising a natural-language follow-up question;

responsive to receiving the fourth user input, submitting the natural-language follow-up question to the generative AI agent; and presenting, in the GUI, a second answer received from the generative AI agent in response to the natural-language follow-up question.

10. The one or more non-transitory computer-readable media of claim 9, wherein submitting the natural-language follow-up question to the generative AI agent comprises resubmitting the two or more initialized context variables to the generative AI agent.

11. The one or more non-transitory computer-readable media of claim 1, the operations further comprising:

based on the natural language query:

generating a non-LLM query for two or more of the values of metadata associated with the two or more data items of the plurality of data items; and submitting the non-LLM query to a non-LLM system obtain the two or more of the values of metadata associated with the two or more data items of the plurality of data items.

12. The one or more non-transitory computer-readable media of claim 11, the operations further comprising:

training a machine learning model to generate non-LLM queries for values of metadata based on natural language queries.

13. A method comprising:

presenting an action definition interface for defining a custom action;

receiving, via the action definition interface, first user input that defines a generative artificial intelligence (AI) agent prompt comprising: (a) a natural language query; and (b) two or more context variables that provide context for the natural language query;

based at least in part on the first user input, storing a definition of the custom action comprising the generative AI agent prompt;

presenting a graphical user interface (GUI) comprising a visual representation of a plurality of data items;

receiving, via the GUI, second user input that selects two or more data items of the plurality of data items;

based on the stored definition of the custom action: presenting, in the GUI, an option to execute the custom action for the two or more data items of the plurality of data items;

receiving, via the GUI, third user input selecting the option to execute the custom action for the two or more data items of the plurality of data items;

responsive to receiving the third user input:

assigning values of metadata associated with the two or more data items of the plurality of data items to the two or more context variables to yield two or more initialized context variables;

submitting the generative AI agent prompt, comprising the natural language query and the two or more initialized context variables, to a generative AI agent; and presenting, in the GUI, a first answer received from the generative AI agent in response to the generative AI agent prompt; and wherein the method is performed by at least one device including a hardware processor.

14. The method of claim 13:

wherein presenting the action definition interface is performed for a first user who has credentials to define the custom action; and wherein receiving the second user input that selects the two or more data items of the plurality of data items is performed for a second user who does not have credentials to define the custom action.

15. The method of claim 13:

wherein the two or more data items of plurality of data items correspond to a plurality of services deployed respectively to a plurality of nodes in a multi-node system, wherein the plurality of services is associated with a log analytics system.

16. The method of claim 13, wherein the first user input selects the generative AI agent from a plurality of endpoints, wherein at least one of the plurality of endpoints is not LLM-based.

17. A system comprising:

at least one device including a hardware processor;

the system being configured to perform operations comprising:

presenting an action definition interface for defining a custom action;

receiving, via the action definition interface, first user input that defines a generative artificial intelligence (AI) agent prompt comprising: (a) a natural language query; and (b) two or more context variables that provide context for the natural language query;

based at least in part on the first user input, storing a definition of the custom action comprising the generative AI agent prompt;

presenting a graphical user interface (GUI) comprising a visual representation of a plurality of data items;

receiving, via the GUI, second user input that selects two or more data items of the plurality of data items;

based on the stored definition of the custom action: presenting, in the GUI, an option to execute the custom action for the two or more data items of the plurality of data items;

receiving, via the GUI, third user input selecting the option to execute the custom action for the two or more data items of the plurality of data items;

responsive to receiving the third user input:

assigning values of metadata associated with the two or more data items of the plurality of data items to the two or more context variables to yield two or more initialized context variables;

submitting the generative AI agent prompt, comprising the natural language query and the two or more initialized context variables, to a generative AI agent; and presenting, in the GUI, a first answer received from the generative AI agent in response to the generative AI agent prompt.

18. The system of claim 17, wherein the first user input defines one or more transformations to apply to the two or more initialized context variables before submitting the generative AI prompt to the generative AI agent.

19. The system of claim 17, wherein the visual representation of the plurality of data items comprises a first chart that represents a first two or more data items of the plurality of data items and a second chart that represents a second two or more data items of the plurality of data items; and wherein the second user input comprises selections from both the first chart and the second chart.

20. The system of claim 17, the operations further comprising:

receiving fourth user input comprising a natural-language follow-up question;

responsive to receiving the fourth user input, submitting the natural-language follow-up question to the generative AI agent;

presenting, in the GUI, a second answer received from the generative AI agent in response to the natural-language follow-up question; and wherein submitting the natural-language follow-up question to the generative AI agent comprises resubmitting the two or more initialized context variables to the generative AI agent.

21. The system of claim 17, the operations further comprising:

based on the natural language query:

generating a non-LLM query for two or more of the values of metadata associated with the two or more data items of the plurality of data items; and submitting the non-LLM query to a non-LLM system obtain the two or more of the values of metadata associated with the two or more data items of the plurality of data items; and training a machine learning model to generate non-LLM queries for values of metadata based on natural language queries.

* * * * *